United States Patent [19]

Stange

[11] Patent Number: 4,684,310
[45] Date of Patent: Aug. 4, 1987

[54] WHEEL MANIPULATOR

[76] Inventor: Charles E. Stange, R.R. #2 - Box 45, Wyoming, Ill. 61491

[21] Appl. No.: 762,861

[22] Filed: Aug. 6, 1985

[51] Int. Cl.⁴ ............................................. B60B 29/00
[52] U.S. Cl. .................................... 414/427; 414/466; 414/785; 414/540; 414/590; 414/620; 224/42.24; 254/4 R; 254/134; 269/48; 269/52; 269/58; 187/11; 187/8.49
[58] Field of Search ............... 414/426, 427, 428, 429, 414/457, 463, 464, 465, 466, 539, 540, 589, 590, 620, 621, 592, 908, 785; 269/17, 47, 48, 52, 57, 58; 254/4 R, 133 R, 2 R, 134; 187/8.47, 8.49, 9 R, 11; 224/42.12, 42.24, 42.26, 42.29, 42.06

[56] References Cited

U.S. PATENT DOCUMENTS

| | | |
|---|---|---|
| 1,506,833 | 9/1924 | Higginbotham .................... 414/465 |
| 1,573,840 | 2/1926 | Lyday ................................ 414/428 |
| 1,864,829 | 6/1932 | Kennedy et al. .................. 414/464 |
| 1,966,766 | 7/1934 | Raby et al. . |
| 2,329,613 | 9/1943 | Horanson et al. ............. 414/426 X |
| 2,379,587 | 7/1945 | Moore .................................. 414/427 |
| 2,380,313 | 7/1945 | Johnson et al. . |
| 2,407,080 | 9/1946 | Johnson et al. . |
| 2,455,432 | 12/1948 | Martin . |
| 2,514,781 | 7/1950 | Miller . |
| 2,595,131 | 4/1952 | Ehmann ......................... 414/621 X |
| 3,474,840 | 10/1969 | Scott . |
| 3,501,037 | 3/1970 | Donovan . |
| 3,677,320 | 7/1972 | Corless . |
| 3,685,125 | 8/1972 | DePierre ......................... 414/427 X |
| 4,022,341 | 5/1977 | Lindquist ............................ 414/426 |
| 4,042,139 | 8/1977 | Pernsteiner et al. ................ 414/427 |
| 4,056,207 | 11/1977 | Spilker ............................ 414/427 X |
| 4,485,945 | 12/1984 | Ankeny ........................... 414/463 X |
| 4,571,142 | 2/1986 | Niewald et al. ................ 254/2 R X |

FOREIGN PATENT DOCUMENTS 3331342  3/1985  Fed. Rep. of Germany ...... 414/427
 793306  4/1958  United Kingdom ............... 414/463

Primary Examiner—Frank E. Werner
Attorney, Agent, or Firm—Evan D. Roberts

[57] ABSTRACT

A wheel manipulator for engaging and retaining the hub of a wheel thereto, having a base frame with a vertical column, a carriage slidably mounted on the column and adapted to be vertically adjustably positioned thereon, a turret rotatably mounted on the carriage and a retainer for securing the wheel to the turret for manipulation of the wheel on the base frame.

3 Claims, 9 Drawing Figures

WHEEL MANIPULATOR

BACKGROUND OF THE INVENTION

In known types of wheel mounting dollies or tire removing and/or holding mechanisms, there is no provision of the combination of a turret, which is rotatably mounted on a carriage that is vertically adjustable on a stand column, and which provides complete manipulation of the wheel.

SUMMARY OF THE INVENTION

This invention relates to a wheel manipulator for use in the controlled manipulation of vehicle wheels for the purpose of removing the wheel from the vehicle, and/or removing the tire or other parts of the wheel from the rim or hub or whatever positioning or other manipulation which might be required for the repair and maintenance of a wheel.

It is the general primary object of the wheel manipulator of this invention to provide an improved and more versatile wheel manipulator, which when operated, will provide for use with wheel rims having lug openings or internal rim flanges, and which will provide selective vertical positionment on a stand mounted column.

It is a further object of this invention to provide an improved wheel manipulator which is provided with a completely free rotatable turret to be vertically adjustably positionable, and which has a plate means secured thereto which is adapted to fixedly receive a wheel hub having either lug openings or rim flanges.

An additional object of this invention is to provide an improved wheel manipulator having the plate as above set forth, which is radially extendably adjustable, and which is adjustably capable of attaching to a hub or internal rim flange of a wheel to secure the wheel to the wheel manipulator for full and complete manipulation thereof.

Other advantages and novel aspects of the invention will become apparent upon review of the following detailed description in conjunction with the accompanying drawings wherein.

Figure 1:
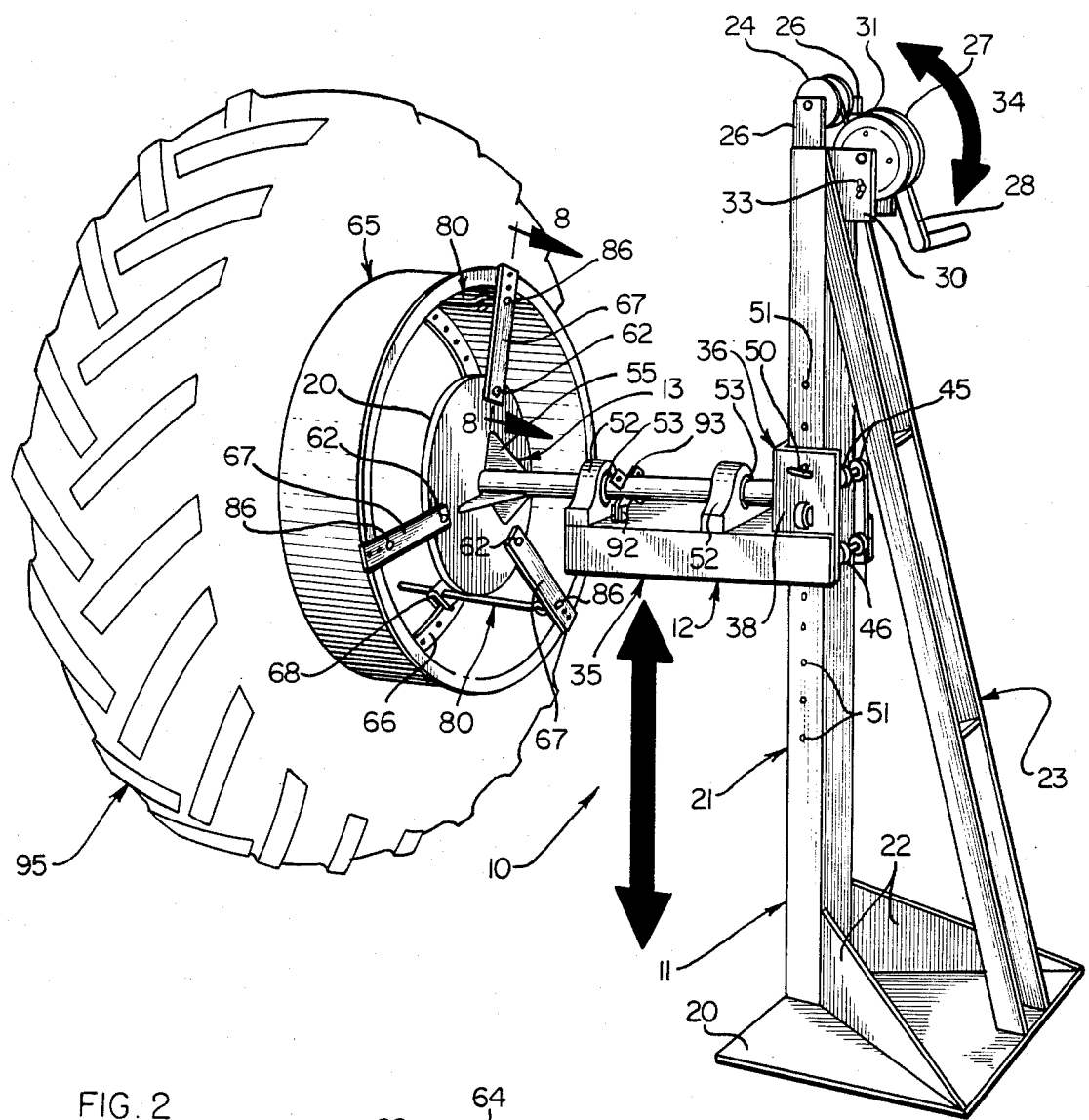
FIG. 1 is a general perspective view of the wheel manipulator of this invention showing the general use of the invention with its vertically adjustable carriage, turret rotatably mounted thereto, attachment of the wheel hub to the turret and, in this instance, the hub or wheel rim partially removed from the respective tire of the wheel.

The representative embodiment of the improved wheel manipulator of this invention is generally illustrated by the numeral 10 (FIG. 1), and includes generally a base frame 11, a carriage 12, a turret 13 and wheel hub retaining means 14.

Figure 4:
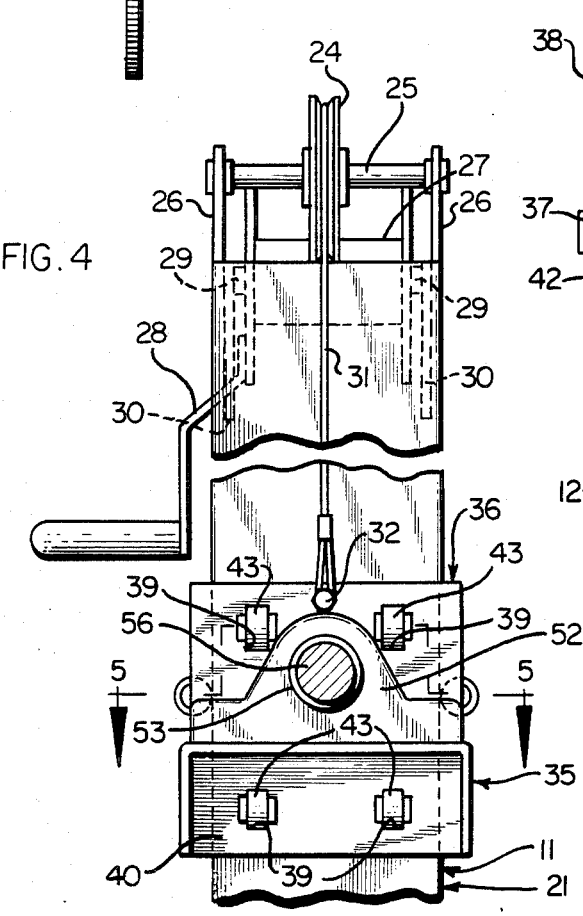
FIG. 4 is a partial back elevation view showing the vertical pulley and cable adjustment for the carriage on the stand mounted column.
Figure 5:
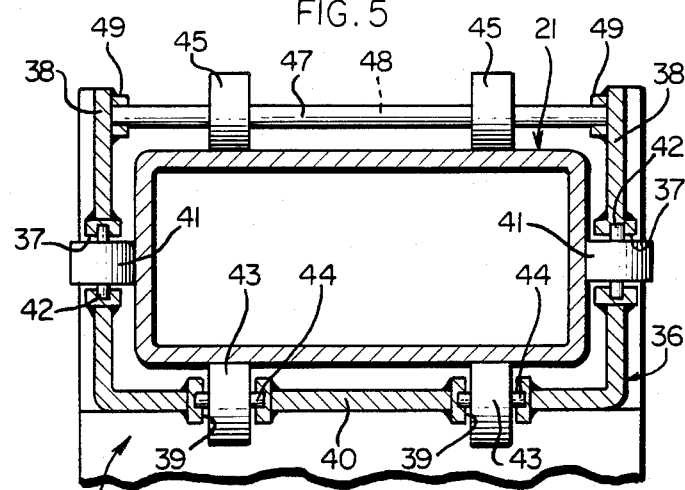
FIG. 5 is a sectional view taken along line 5—5 of FIG. 4 showing the roller bearing mount of carriage on said column.
Figure 6:
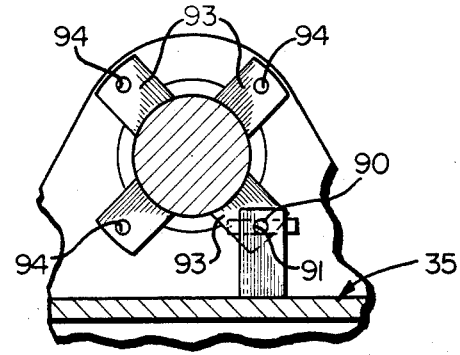
FIG. 6 is a partial sectional view taken along line 6—6 of FIG. 3 showing the radial locking mechanism of the rotatational mount of the turret on the vertically adjustable carriage.
Figure 9:
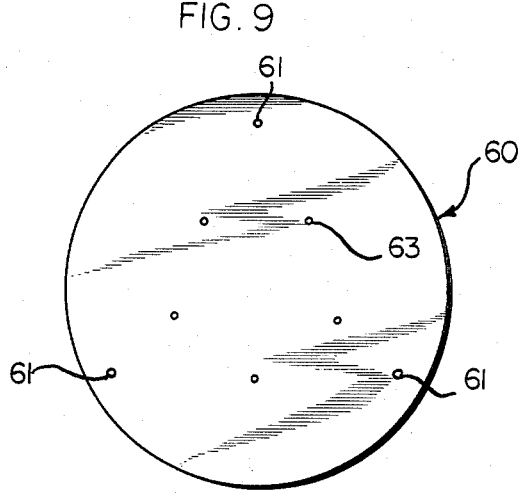
FIG. 9 is a vertical plan view of a plate showing an example of the positions of apertures therein for retaining the expandable portion thereof and for retaining the hub directly thereto.

The base frame 11 (FIGS. 1 and 3-5) is provided with a base plate 20 (FIG. 1) and a vertical box channel column 21 secured thereto and extending vertically therebetween from braced by angle plates 22 and ladder braces 23 column 21 and base plate 20. For stability of manipulator 10, plate 20 is secured to the floor by bolts, clamps, etc. (not shown). A pulley 24 (FIGS. 1, 4 and 5) is rotatably mounted on shaft 25 supported on, and between, brackets 26. Flanged crank drum 27 is rotatably actuatable by crank 28 on shaft 29 supported on, and between, crank drum brackets 30.

A cable 31 (FIGS. 1, 3 and 4) attached to and wrapped on crank drum 27, extends over pulley 24 and vertically downward to a carriage attachment 32. Drum 27 is selectively held against rotation by wing pin 33 insertable through aligned openings in brackets 30 and circumferentially spaced selected apertures 34 in drum 27.

Carriage 12 (FIGS. 1-6) has a horizontal journal bearing frame 35 which, in turn, has a vertical channel carriage receiving bearing assembly 36 as part thereof. Bearing assembly 36 has a U-shaped cross section (FIG. 5) and has a bearing opening 37 in each side 38 thereof and four bearing openings 39 in the front connecting portion 40 thereof.

Side roller bearings 41 are positioned in each side of opening 37 on journals 42 that are rotatably retained in sides of openings 37. Front roller bearings 43 are positioned in respective openings 39 on journals 44 that are rotatably retained in the sides of openings 39. Bearing assembly 36 is supported on the back of column 21 by two pairs of roller bearings 45 and 46 on respective shafts 47 and 48 mounted in bearings 49 on the inside of bearing assembly sides 38. Thus, bearing assembly 36 is completely slidably mounted by roller bearings 41, 39, 45 and 46 whereby carriage 12 by frame 35 is vertically adjustably mounted on column 21.

Assembly 36 has a screw pin 50 threadably mounted therein, and adapted to enter into selected openings 51 in column 21 whereby carriage 12 can be retained against vertical movement by threadably moving the pins 50 into selected column openings 51.

Carriage 12 is also provided with bearing housings 52 with horizontally aligned bearings 53. Turret 13 has radially extending longitudinal flanges 55 on a shaft 56 which, in turn, is rotatably retained in aligned bearings 53 of carriage 12.

Wheel hub retaining means 14 (FIGS. 1-3 and 7-9) includes a plate 60 secured to turret 13 transversely to the axis of turret shaft 56. Plate 60 is shown perpendicular to, and concentric with, the axis of turret shaft 56. However, plate 60 could be mounted at other than perpendicular or concentric with axis 56 for varied circumstances of use.

Plate 60 (FIGS. 1-3) is provided with three circumferentially spaced axial openings 61 therethrough to accommodate radial extension bars 67 (FIGS. 1 and 7-9) secured thereto by a bolt and nut arrangement 62 through opening in an inner end portion of extensions 67. Alternatively, and in addition, plate 60 is provided with lug apertures 63 to similarly accommodate a wheel hub 64 (FIGS. 2 and 9) bolted directly to corresponding wheel hub bolt apertures, as determined by the pattern of the wheel hub 64 bolt apertures.

In a hub 65 where there is no readily accessible wheel hub bolt aperture, but where in there is an internal radial extending rim flange 66 (FIGS. 1 and 8), plate 60 and extensions 67 are provided as part of the means 14 for retaining rim flange hub 65 to plate 60 of turret 13. Rim clamps 68 are circumferentially positioned and secured to the internal rim flange 66 of hub FIGS. 1 and 8).

Rim clamps 68 are radially received over hub rim 66 with leg portions 69 and 70 thereof slidably positioned on opposite sides of rim flange 66. Curved portion 71 of the clamp 68 extends inwardly from rim 66 and each clamp 68 is provided with aligned apertures 72 and 73 (FIGS. 7 and 8) through legs 69 and 70 thereof, adjacent curved portion 71, with the outer leg aperture 73, away from plate 60, being threaded.

Figure 7:
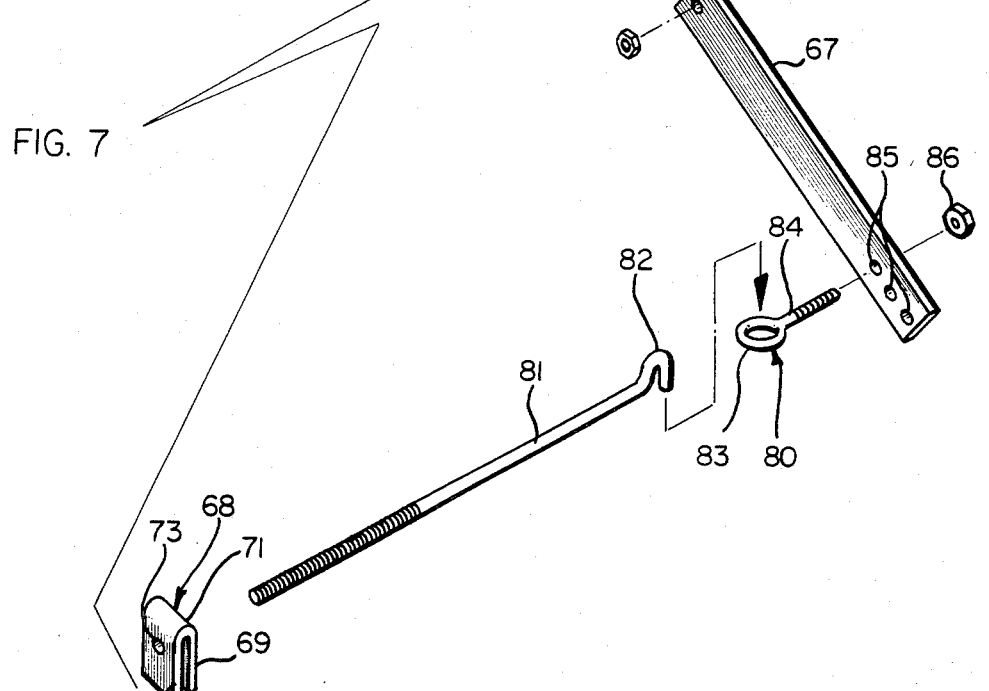
FIG. 7 is an exploded perspective view of the expandable wheel plate and the rim clamps and anchor plates thereof for retaining the wheel thereto.
Figure 8:
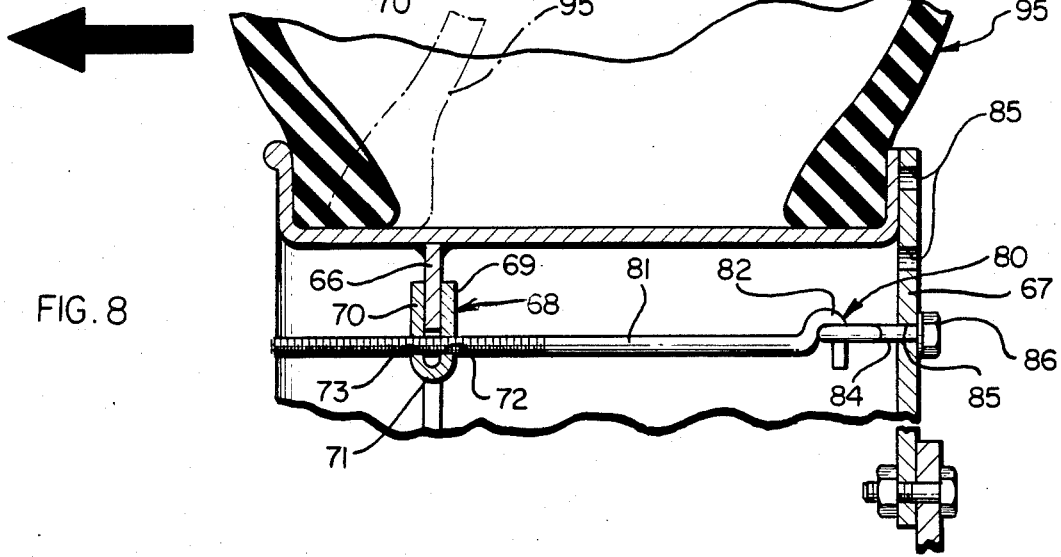
FIG. 8 is a partial sectional view taken along line 8—8 of FIG. 1 showing the rim attachment of the wheel to the turret, by the rim clamps and plate anchored, to the radially expandable plate.

Plate anchors 80 have a threaded shaft 81 inserted through unthreaded openings 72 in respective rim clamps 68 and threadably engaged in the outer threaded openings 73 of rim clamp 68. Inner end of the plate anchor shaft 81 has a hook 82 (FIGS. 1, 7 and 8) which is inserted into eyelet 83 of threaded eyebolt 84. Eyebolt 84 is inserted through selected adjustment openings 85 in a respective plate extension 67, and secured thereto by nut 86 threaded thereon. This will secure rim hub 65 to plate 20 of turret 13 (FIGS. 1 and 8).

Turret 13 can be selectively locked against rotation by selective insertion of pin 90 (FIGS. 3 and 6) slidably mounted in openings 91 of vertical bracket 92 of carriage frame 35 and into opening 94 of selected one of four, or more, stops 93 extending radially from shaft 56. Thus, shaft 56 may be locked in one of four, or more, positions. A tractor tire 95 (FIGS. 1 8) is shown assembled to a rim hub 65 (FIG. 8), and is partially axially removed from rim hub 65 (FIG. 1) and phantom line (FIG. 8).

Figure 2:
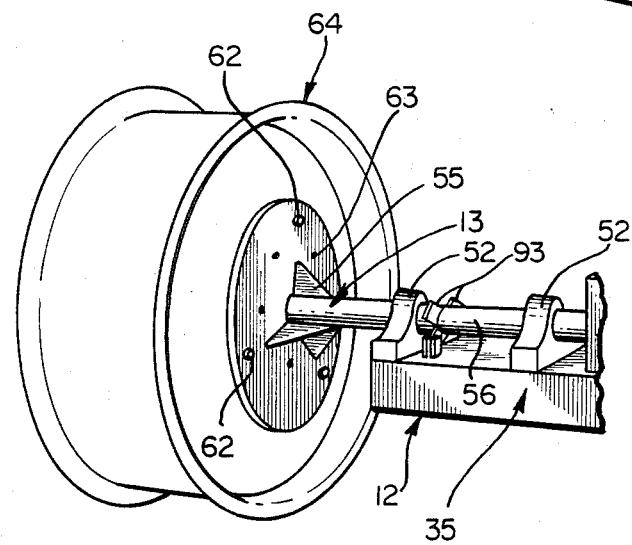
FIG. 2 is a perspective view of a wheel rim with the turret plate secured thereto by lugs fastened through the hub of the wheel to the turret plate.
Figure 3:
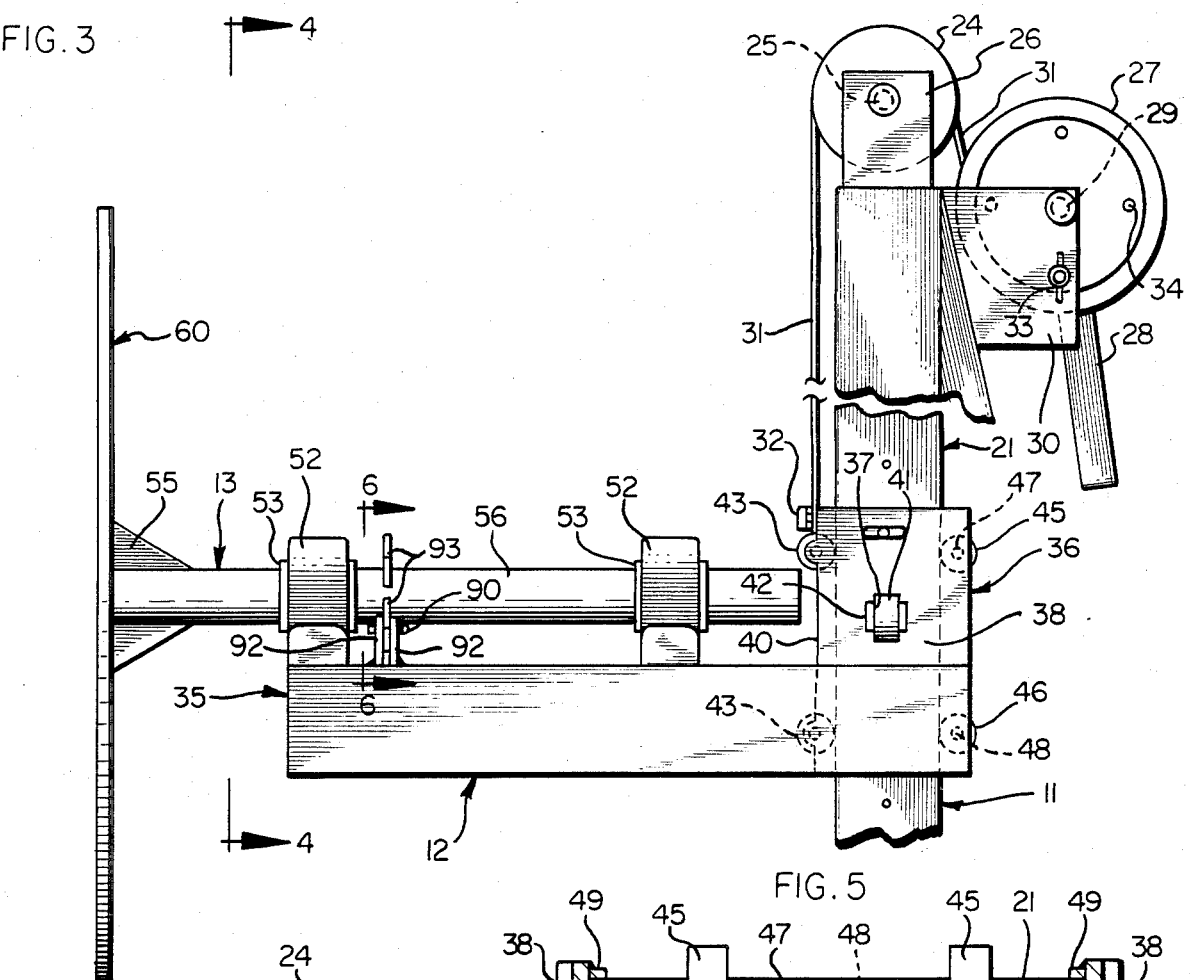
FIG. 3 is a partial side elevation view of the wheel manipulator of this invention showing the turret and wheel plate rotatably mounted on the vertical and adjustable carriage.

In operation, a tire such as 95 (FIG. 1) is positioned adjacent wheel manipulator 10 with the axis of the rim 65 of tire 95 in alignment with column 12 and shaft 56. Carriage 12 is vertically adjusted on column 21, as indicated by the double headed arrow (FIG. 1) by selective rotation of cable drum 27 by manually selectively rotating crank 28. This adjustment is made to align shaft 56 with the center of hub 65 or 64 (FIG. 1 or 2).

As drum 27 is rotated by crank 28, cable 31 is either taken up on drum, or let out from the drum, depending on which direction crank 28 is rotated. As cable 31 is let out of drum 27, carriage 12 will move downwardly on column 21. As cable 31 is taken up on drum 37, carriage 12 will move upwardly on column 21.

In the situation where the wheel, to be manipulated, has a hub similar to that of hub 64 (FIG. 2), hub 64 is attached directly to plate 20 by nut and bolt arrangement 62. Column 12 can be fixedly adjusted to column 21 by adjustably rotating drum 37 whereby cable 31 will adjustably raise or lower carriage 12, and wing pin 50 can be inserted into aligned openings 51 of column 21. Carriage 12 is thereby adjustably retained against vertical movement.

Wheel or hub 64 can than be rotated, as fixed to plate 20, to adjustably rotate shaft 56 and stops 93 thereof until a stop 93 is presented within brackets 92 with opening of stop 93 in alignment with openings of bracket 92. Wing pin 90 is then inserted through aligned apertures of a selected stop 93 and openings of bracket 92 to adjustably fixedly retain shaft 56, and thereby rim 64, against rotation. In the above manner, a hub rim 64 is placed under the manipulative control of the wheel manipulator 10, so that same can be selectively positioned vertically and radially.

In the situation where the wheel, to be manipulated, has a hub like that of hub 65 (FIGS. 1 and 8), hub 65 is attached to plate 20 through extensions 67. Extensions 67 are secured at the inner end thereof to plate 20 by nut and bolt arrangement 62, and the outer ends of extensions 67 with the adjustment openings 85 positioned on the outer edge of hub 65. Hub 65 is retained to plate 20 and extension 67 by rim clamps 68 and plate anchors 80 (FIGS. 1, 7 and 8).

More particularly, rim clamps 68 are respectively positioned for each extension 67, over internally extending rim flange 66 (FIGS. 1, 7 and 8) with the rounded portion 71 extending inwardly, and the threaded apertures 73 positioned on the side away from plate extensions 67. Hook screw shaft 81 is inserted in unthreaded aperture 72 of respective clamp 68, and threadably retained through threaded aperture 73 (FIG. 8).

Eyebolt 84 is attached in an appropriate radially positioned adjustment opening 85 of a respective plate extension 67 with hook 82 of hook shaft 81 in eyebolt 84. Nut 86 is threaded over eyebolt 84 on the carriage side of plate extension 67 to tighten plate anchor 80, and thus, brackets 68 over rim flange 66 to hold wheel hub 65 against the outer end of plate extensions 67.

Wheel hub 65 can then be rotated, as fixed to plate 20, to adjustably rotate shaft 56 and stops 93 thereof until a stop 93 is presented within brackets 92 with opening of stop 93 in alignment with openings of bracket 92. Wing pin 90 is then inserted through aligned apertures of a selected stop 93 and openings of bracket 92 to adjustably fixedly retain shaft 56, and thereby rim 65, against rotation. In the above manner, a hub rim of a wheel 65 is placed under the manipulative control of the wheel manipulator 10, so that same can be selectively positioned vertically and radially.

It is to be understood that the invention is not to be limited to the specific constructions and arrangements shown and described, as it will be understood to those skilled in the art that certain changes may be made without departing from the principles of the invention.

What is claimed is:

1. A wheel manipulator for manipulating a wheel having a hub comprising a base frame having a vertical column, a carriage slidably mounted on said column and adapted to be vertically adjustably positiond thereon, a turret rotatably mounted on said carriage and means for retaining a wheel hub to said turret, said retaining means having a plate secured to said turret in axial engagement with said hub and having a plane positioned transversely to the axis of rotation of said turret, and means for securing said wheel hub to said plate, said hub has an internal rim flange and said securing means comprises rim clamps adapted to be circumferentially secured to the internal rim flange of said hub, plate anchors secured to said plate in radial positions therearound and respectively adapted to engage said rim clamps to secure said hub against movement relative to said plate to be manipulated therewith, said rim clamps comprise U-shaped brackets having two leg portions interconnected at one end by a curved portion adapted to be frictionally radially received over said hub rim with said leg portions of each of said brackets being respectively positioned radially on respective opposite radial sides of the rim and the curved portion of said brackets positioned radially inwardly from said rim, said brackets having aligned openings through the legs thereof adjacent the curved portion thereof with one of said openings being threaded to threadably receive a threaded shaft, said plate anchors having a shaft with a threaded end inserted through the other of said openings in a respective rim bracket and threadably retained in said threaded opening of said bracket, and a hooked end adjacent said plate, and adjustable attachment means adapted to engage said hook end of said shaft and said plate for retaining said rim and hub to said plate.

2. A wheel manipulator as defined in claim 1 wherein said plate is secured with the plane thereof perpendicular to the axis of rotation of said turret.

3. A wheel manipulator as defined in claim 1 wherein said plate has radially adjustable extensions thereof for engaging said rim.

* * * * *

UNITED STATES PATENT AND TRADEMARK OFFICE
CERTIFICATE OF CORRECTION

PATENT NO. : 4,684,310

DATED : AUGUST 4, 1987

INVENTOR(S) : CHARLES E. STANGE

It is certified that error appears in the above-identified patent and that said Letters Patent is hereby corrected as shown below:

Column 2  Line 3   Cancel the ":" and insert --;--;

Column 2  Line 20  Cancel the words "therebetween from" and insert --therefrom--;

Column 2  Line 21  After the numeral "23" insert the word --between--;

Column 3  Line 19  Insert a --(-- before the word "FIGS."; and

Column 4  Line 4   Cancel "than" and insert --then--.

Signed and Sealed this

Second Day of February, 1988

Attest:

DONALD J. QUIGG

*Attesting Officer*     *Commissioner of Patents and Trademarks*